June 26, 1962 L. C. PEARCE 3,040,456
APPARATUS FOR REMOVING TREES
Original Filed Jan. 12, 1959 5 Sheets-Sheet 1

INVENTOR.
LEWIS C. PEARCE
BY
Mellin and Hanscom
ATTORNEYS

INVENTOR.
LEWIS C. PEARCE
BY
Meelin and Hanscom
ATTORNEYS

June 26, 1962 L. C. PEARCE 3,040,456
APPARATUS FOR REMOVING TREES
Original Filed Jan. 12, 1959 5 Sheets-Sheet 3

INVENTOR.
LEWIS C. PEARCE
BY
Mellin and Hanscom
ATTORNEYS

June 26, 1962 L. C. PEARCE 3,040,456
APPARATUS FOR REMOVING TREES
Original Filed Jan. 12, 1959 5 Sheets-Sheet 4

INVENTOR.
LEWIS C. PEARCE
BY
Mellin and Hanscom
ATTORNEYS

June 26, 1962 L. C. PEARCE 3,040,456
APPARATUS FOR REMOVING TREES
Original Filed Jan. 12, 1959 5 Sheets-Sheet 5

INVENTOR.
LEWIS C. PEARCE
BY
Mellin and Hanscom
ATTORNEYS

United States Patent Office 3,040,456
Patented June 26, 1962

3,040,456
APPARATUS FOR REMOVING TREES
Lewis C. Pearce, Berea, Ohio, assignor to Pearce Development Company, Cleveland, Ohio, a corporation of Ohio
Original application Jan. 12, 1959, Ser. No. 786,376, now Patent No. 2,977,716, dated Apr. 4, 1961. Divided and this application Jan. 9, 1961, Ser. No. 81,623
21 Claims. (Cl. 37—2)

This invention relates to apparatus for removing mature trees from the ground without damage thereto, so that the trees may be later replanted.

This is a divisional application of an application filed January 12, 1959 bearing Serial No. 786,376, and issued as U.S. Patent No. 2,977,716.

In general, the apparatus of the present invention may be used in the removal of mature trees, as for example ranging upwardly to thirty, or even more feet in height. In the present invention, as well as in tree removing methods heretofore used, a core of earth is removed with the tree, with the root structure of the tree being within the core. In any tree removal operation, it is essential that the core of earth be sufficiently large so that the bulk of the root structure is removed with the tree, and that the root structure be undisturbed as the tree is removed. Obviously, if insufficient of the root structure is removed with the tree, the tree will be unable to nourish itself, and will quickly die. Also, if the root structure is disturbed, as by undue relative movement between the roots and the core of earth, the tiny root hairs will pull loose from the roots, and, again, the tree will not be able to nourish itself sufficiently.

As is generally known, the bulk of the root structure of a tree lies relatively closely to the surface of the ground, and radiates generally outwardly from the tree trunk over an area roughly approximate to the horizontal extent of the limb structure of the tree. As a consequence, the core of earth removed with the tree should have a horizontal diameter roughly equal to the diameter of the above ground limb structure of the tree, which will then ensure that sufficient of the root structure will be retained with the tree so that the tree will not die. The depth of the core of earth necessary to be removed will depend on the type of tree and the nature of the soil, but in most events this depth will be relatively small as compared with the horizontal diameter of the core.

It is the primary object of this invention to provide apparatus for the removal of trees wherein the core of earth retained with the tree is generally cylindrical, with the horizontal diameter of the cylindrical core being greater than the height of the core.

Another object of the invention is to provide apparatus for removing trees wherein the tree trunk is maintained in a fixed position relative to the core of earth removed therewith to prevent the root hairs from being damaged during removal.

A further object of the invention is to provide apparatus for removing trees wherein a narrow annular trench is dug around the core of earth, the core is then horizontally undercut, the undercut bottom is supported in fixed relation to the tree trunk and the tree and severed core are removed from the ground.

Yet another object is to provide means for undercutting the core of earth containing the roots of the tree without damage to the root structure.

A further object is to provide means for protecting the tree and earth core during shipping and storage.

Further objects and advantages will become apparent in the course of the following detailed description.

In the drawings, forming a part of this application, and in which like parts are identified by like reference numerals throughout the same.

In general, the tree removal method of the present invention is accomplished by first clearing the ground around the tree to be removed. A soil plate is then placed on the ground, surrounding the trunk of the tree. The soil plate is secured to the ground to prevent relative movement between the soil plate and the tree. An upstanding collar on the soil plate extends up around the tree trunk, and is secured firmly thereto to support the tree relative to the ground.

The soil plate is generally circular, with a diameter generally equal to the desired diameter of the core of earth to be removed, and is provided with a series of index, or guide, holes around the periphery thereof. Suitable apparatus is then used in conjunction with and around the periphery of the soil plate to form a narrow annular trench of a depth approximately equal to the height of the desired core to be removed with the tree.

After the trench has been dug, a cable is placed in the bottom of the trench. The ends of the cable are then pulled back and forth, in a whipsaw fashion, to completely sever the core in a horizontal plane. The core has now been completely cut free from the surrounding earth, and is cylindrical in shape.

Next, suitable supporting devices are lowered into the trench and inserted in the horizontal cut, underneath the core and around the periphery thereof. The supporting devices are also rigidly secured to the soil plate, around the periphery therof.

The soil plate is then lifted vertically out of the hole, by a suitable fork lift device, and a protective covering is secured to the bottom of the core, as well as to the sides thereof, if desired, to ready the tree for shipment.

The Soil Plate

Figure 1:
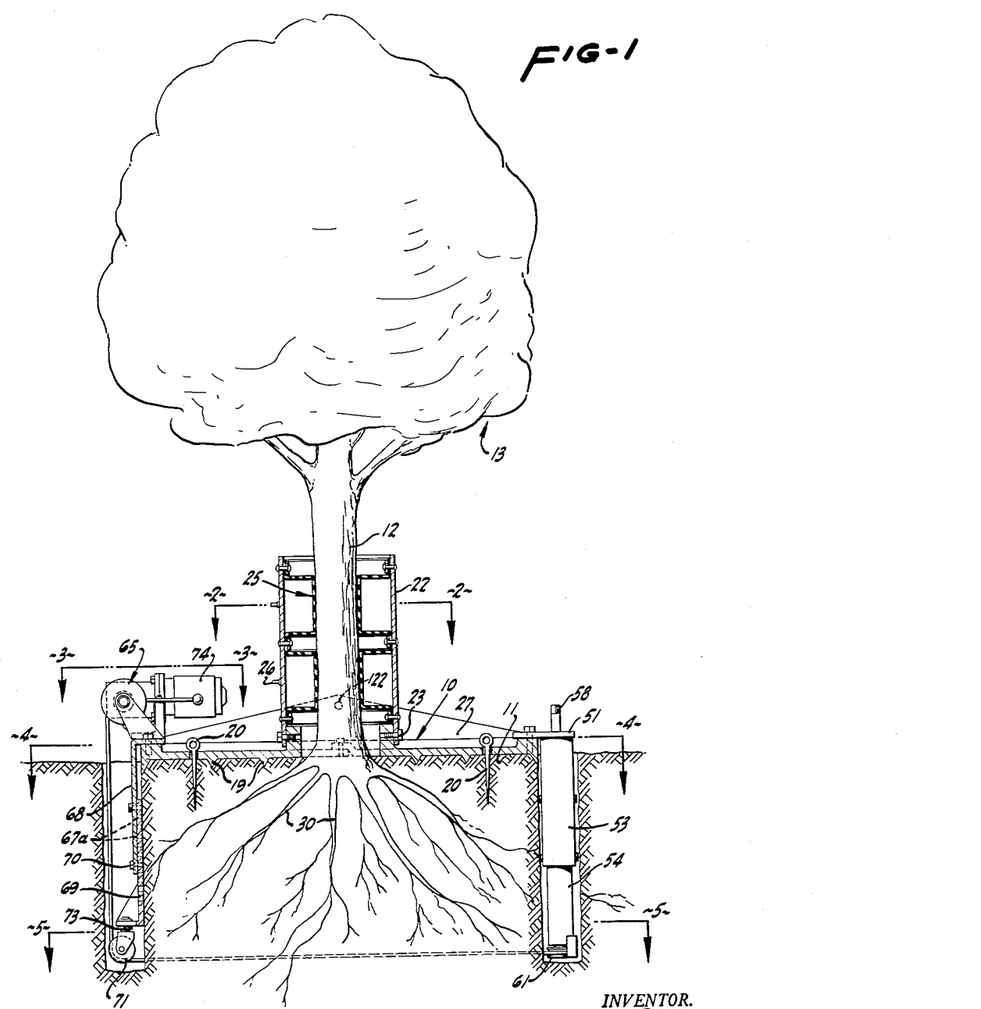
FIG. 1 is an elevational view illustrating the mechanism used in undercutting the soil core surrounding the roots of a tree, with parts shown in section.
Figures 2, 3, 6, 7:
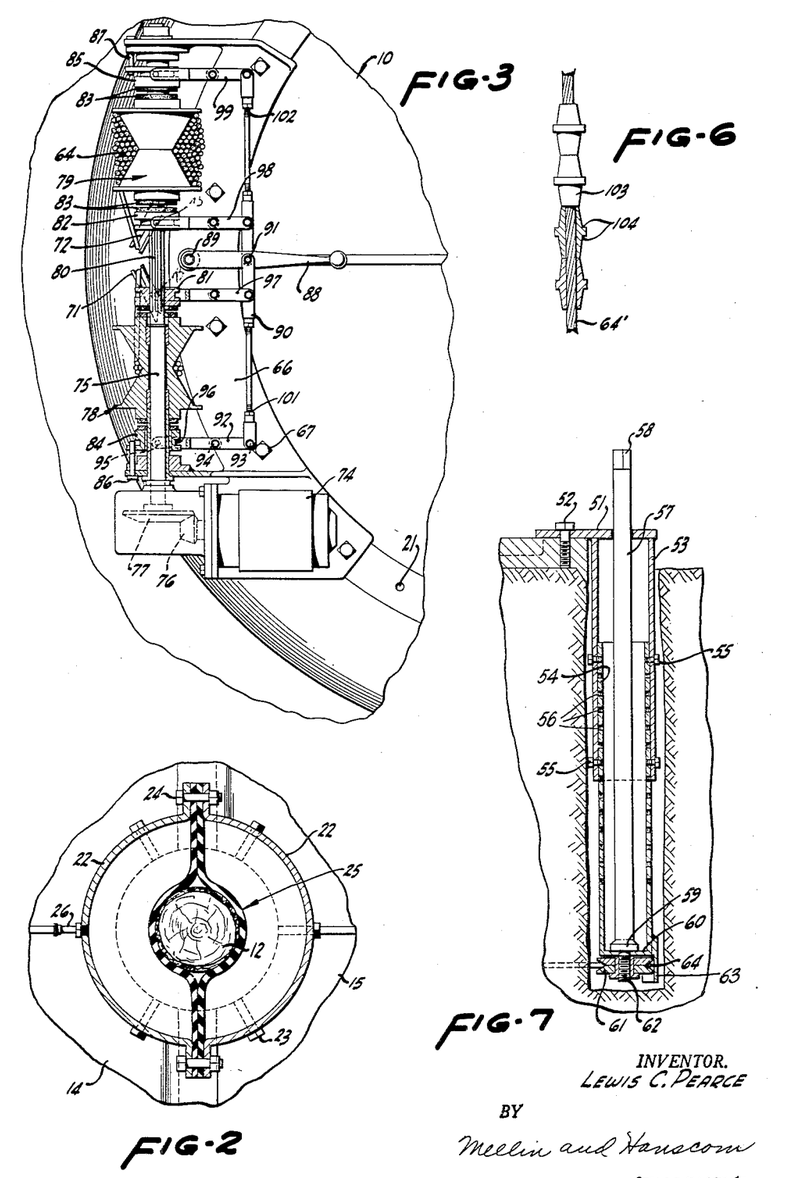
FIG. 2 is a horizontal section, taken on line 2—2 of FIG. 1, and illustrating the details of the trunk-embracing pneumatic collar.
FIG. 3 is a plan view, as seen from the line 3—3 of FIG. 1, showing the details of the reversing cable drive mechanism used in undercutting the soil core.
FIG. 6 is an enlarged detail of a modified cable usable in the invention for undercutting the soil core.
FIG. 7 is a section in elevation, taken on line 7—7 of FIG. 4, illustrating a cable sheave carrier assembly used in undercutting the soil core.
Figure 4:
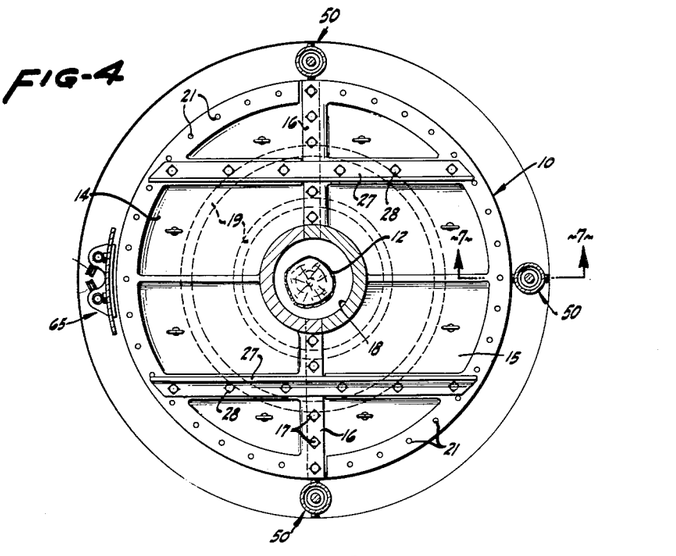
FIG. 4 is a horizontal section, taken on line 4—4 of FIG. 1, showing the details of the soil plate.

Referring now to the drawings, and in particular to FIGS. 1, 2 and 4, the segmental soil plate 10 is placed on the ground 11 surrounding the trunk 12 of tree 13. As seen in FIG. 4, the soil plate 10 is comprised of two semicircular segments 14 and 15 which are joined together by lap joints 16 and secured together by bolts 17. As joined, they form a central opening 18 having an internal diameter appreciably greater than the diameter of the tree trunk 12.

A plurality of downwardly extending arcuate ridges 19 may be formed on the bottom of soil plate 10, which dig into the ground and serve to prevent shifting of the soil plate relative to the tree trunk. Spikes 20 are driven through the soil plate into the ground to prevent rotation of the soil plate relative to the tree trunk. A plurality of index or guide holes 21 are spaced around the periphery of the soil plate, for a purpose to be hereinafter described.

Each soil plate segment has a semi-cylindrical collar portion 22 secured rigidly thereto, as by bolts 23, and extending upwardly from the central opening 18 thereof, so that when the soil plate segments are bolted together, the collar portions 22 will form an upstanding cylindrical collar surrounding the tree trunk 12. The collar segments 22 may be bolted together by bolts 24 to ensure rigidity.

Each collar portion has a plurality of semi-annular inflatable packers 25 secured thereto, one above another, with suitable tire valves 26 supplied for each packer.

Before installing the soil plate 10, the ground around the tree trunk is cleared so that the ground surface is approximately level and free from gross debris. The two soil plate segments are then placed around the tree trunk, and bolted together by bolts 17. Bolts 24 secure the collar segments 22 together. Lifting plates 27 are then secured to the soil plate by bolts 28, at right angles to the juncture between the soil plate segments 14 and 15, which forms the segmented soil plate 10 into a completely rigid member. The pins 20 are then driven into the ground.

The inflatable packers 25 are inflated, by a suitable air compressor (not shown), tightly against the tree trunk 12, to hold the tree trunk in rigid relation to the soil plate. Any irregularities in the tree trunk will be compensated for by the flexibility of these packers and thus the packers can grip the trunk firmly to support the tree relative to the soil plate which, in turn, is rigidly fixed relative to the ground.

The soil plate segments 14 and 15 are chosen in size so that the external diameter of the assembled soil plate 10 is approximately equal to the horizontal diameter of the limb structure of tree 13, thus ensuring that the bulk of the root structure 30 of the tree will lie below the periphery of the soil plate and thus will be within the soil core to be removed.

The soil plate 10 is preferably formed from aluminum, or an alloy thereof, so that it will be sufficiently light in weight to permit easy handling. Also, aluminum is resistant to oxidation and will not be adversely affected by contact with the damp soil.

The Trenching Apparatus

Figures 8, 9, 10, 11:
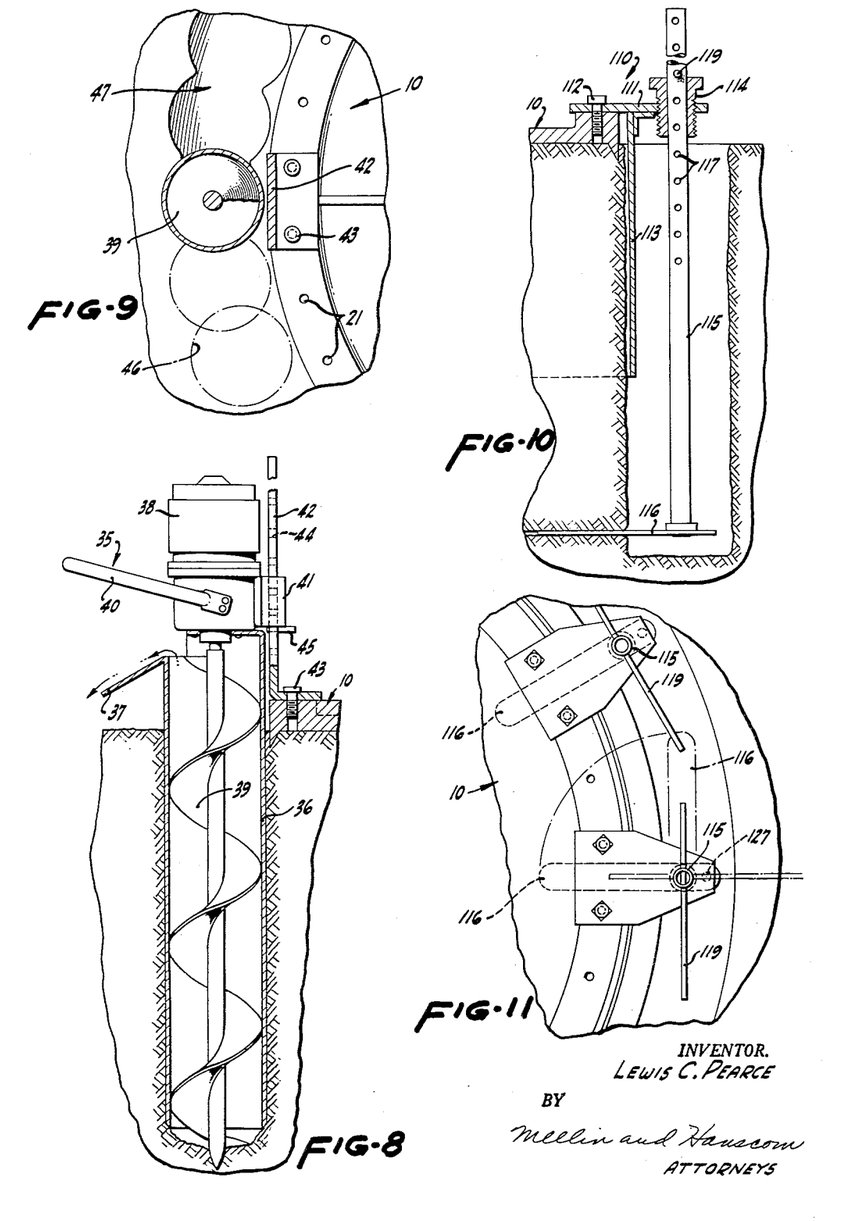
FIG. 8 is an elevational sectional view showing the details of the trenching device used in the invention.
FIG. 9 is a section of the trenching device taken on line 9—9 of FIG. 8.
FIG. 10 is an elevational view of a core bottom supporting device used for supporting the undercut soil core.
FIG. 11 is a plan view of the core bottom supporting device shown in FIG. 10.

After the soil plate 10 is in place and secured to the tree trunk and ground, the trenching apparatus 35, illustrated in FIGS. 8 and 9, is employed to dig a narrow annular trench of a desired uniform depth around the periphery of the soil plate.

The trenching apparatus 35 may comprise a post hole digger having a thin walled tubular guide 36, open at the lower end thereof and provided with a soil discharge chute 37 at its upper end. A suitable motor 38, gasoline or electrically operated as desired, is secured to the upper end of guide 36 to drive the auger bit 39 which is freely rotatable in guide 36 and which extends slightly therebelow. A handle 40 on motor 33 provides for manual operation of the trenching apparatus.

A bracket 41, mounted on motor 38, has a T-shaped groove embracing the vertically extending rail 42 which is secured to the soil plate 10 by suitable pins or bolts 43 extending into the guide holes 21 around the periphery of the soil plate. The rail 42 is sufficiently high so that the bracket 41 will be engaged therewith when the lower end of the auger rests on the surface of the ground. The rail is provided with a plurality of holes 44 spaced at appropriate distances so that a stop pin 45 may be inserted in the rail at a desired height to arrest downward movement of the auger to limit the depth of the hole drilled thereby.

As seen in FIG. 9, the diameter of the auger is such that as the bolts 43 are progressively mounted in successive soil plate index holes 21, the holes 46 drilled by the auger will intersect one another, to form a continuous trench 47 around the periphery of the soil plate, and of a depth determined by the setting of the stop pin 45. The soil removed from the trench will be guided away from the trench by the discharge chute 37.

Thus, after the soil plate 10 is installed around the tree trunk 12, the character of the tree and the soil is taken into consideration, and the stop pin 45 is set into the proper guide rail hole 44, the rail being fixed to a pair of soil plate guide holes 21. A hole 46 is then drilled, and the auger is removed so that the guide rail can be fixed to another pair of soil plate guide holes. The drilling process is continued until the trench 47 is formed completely around the soil plate.

The Undercutting Apparatus

After the trenching operation is complete, the soil core is undercut, along a plane parallel to the soil plate 10, by the apparatus shown in FIGS. 1, 3, 4, 5, 6 and 7.

A plurality of sheave carrier devices 50, illustrated in detail in FIG. 7, are installed in the trench 47 at preselected points around the periphery of the soil plate. Each sheave carrier device comprises a top plate 51, secured to the soil plate index holes 21 by bolts 52, having an upper tube 53 fixed thereto and depending downwardly therefrom. A lower tube 54 telescopes into the lower end of the upper tube 53 and is secured thereto by bolts 55 extending through the aligned adjustment holes 56 in the tubes.

A rod 57, having a square head 58, extends downwardly through the tubes and is provided with an outwardly extending flange 59 which is supported by the inwardly extending flange 60 of the lower tube. A cable sheave 61 is threaded onto the lower threaded end 62 of rod 57. A downwardly extending retainer skirt 63, formed on the lower tube 54, retains cable 64 in place in the groove of the sheave, so that the cable will not accidentally fall off of the sheave.

As is seen in FIG. 7, the overall height of the sheave carrier device is adjusted so that the sheave will be closely adjacent to the bottom of the trench 47.

A cable drive unit 65, illustrated in detail in FIGS. 1 and 3, is also fixedly mounted to the soil plate 10. The cable drive unit includes a base plate 66, mounted to suitable soil plate guide holes by bolts 67, having a depending bracket 68 to which the pulley support bracket 69 is fixedly mounted by bolts 70.

The pulleys, 71 and 72, are mounted for rotation about a horizontal axis by swivel connections 73 to the lower end of the pulley support bracket 69. Again, suitable aligned adjustment holes 67a are provided in the brackets 68 and 69 so that the pulleys may be spaced at a fixed desired distance below the soil plate 10.

A motor 74, powered by gasoline or electricity as desired, is mounted on base plate 66, in continual driving engagement with drive shaft 75, through intermeshing bevel gears 76 and 77.

Cable drums 78 and 79 are mounted on drive shaft 75 for free rotation thereon but are restrained from longitudinal movement relative thereto. The mid-portion of shaft 75 is provided with a plurality of longitudinal splines 80 which extend through complementary grooves in the hubs of clutch plates 81 and 82, so that the clutch plates will rotate integrally with the drive shaft, but will be free to move longitudinally relative thereto into and out of engagement with the cable drums. The interengageable faces of the clutch plates and cable drums are provided with friction plates 83 so that the drums will be rotated by the drive shaft when the clutches are pressed thereagainst.

A pair of brake plates 84 and 85 are also freely mounted on drive shaft 75. Pins 86 and 87, mounted in fixed relation to the base plates and extending through suitable holes in the brake plates, prevent relative rotation between the brake plates and the drive shaft while allowing relative longitudinal movement therebetween so that the brake plates may be moved into engagement with the cable drums. Again, friction plates 83 are fixed to the interengaging faces of the brake plates and cable drums.

A manual operable reversing lever 88, pivoted to the base plate 66 by pivot pin 89, is pivotally connected to connecting rod 90 at 91. A lever 92, pivotally connected to rod 90 and base plate 66 by pivot pins 93 and 94, respectively, carries at its end pin 95 which is received within groove 96 of brake plate 84. By the above described linkage, whenever the lever 88 is moved in a clockwise direction about pivot 89, the brake plate 84 will be moved into engagement with cable drum 78. Conversely, when the lever 88 is moved in a counter-clockwise direction, brake plate 84 will be moved away from cable drum 78.

Levers 97, 98 and 99 are similarly connected to connecting rod 90 and to the clutch plates 81 and 82 and brake plate 85, respectively. Whenever the lever 88 is moved in a clockwise direction, clutch plate 82 will be pressed against cable drum 79 so that the drum will be driven by drive shaft 75, and cable drum 78 will be braked by brake plate 84. An opposite movement of lever 88 will drivingly engage cable drum 78 for rotation by drive shaft 75, and will brake the rotation of cable drum 79.

The connecting rod 90 is adjustable in length, as at 101 and 102, so that the braking force applied to each of the cable drums, when the other cable drum is clutched, may be varied as desired.

Figure 5:
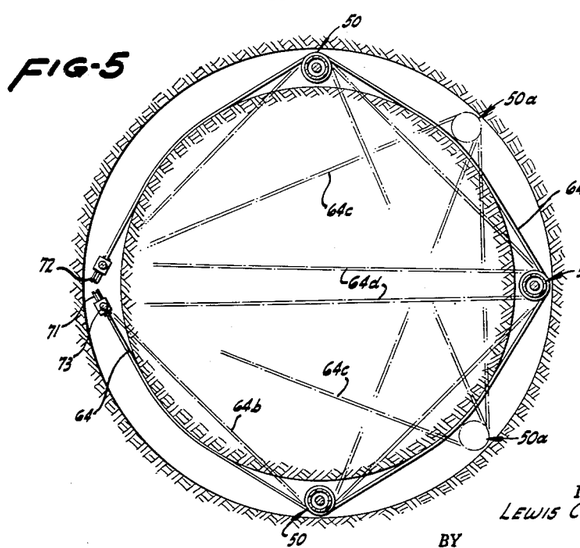
FIG. 5 is a horizontal section, taken on line 5—5 of FIG. 1, illustrating the manner in which the soil core can be progressively undercut.

In installing the undercutting mechanism above described, the cable 64 is attached to a suitable number of sheave carrier devices 50, which are then spaced around the soil plate, as, for example, in the positions indicated by solid lines in FIG. 5. The cable drive mechanism 65 is also fixed to the soil plate, with the pulleys 71 and 72 as shown in FIG. 5. The free ends of the cable are then drawn around the pulleys upwardly to the cable drums 78 and 79, to which they are secured, and the motor 74 is put into operation.

Alternate movement of the handle 88 will cause alternate engagement of the drive shaft 75 with the cable drums 78 and 79 so that the cable 64 will be pulled back and forth around the trench, thus effecting a whipsaw action on the bottom of the soil core. As the cable saws into the soil core, the length of the cable surrounding the soil core and between the pulleys 71 and 72 will diminish, but the braking action of the unclutched cable drum will allow the driven drum to take up the slack. The brake plates are adjusted so that when the slack is taken up, the driven drum may pull cable from the braked drum.

As is seen in FIG. 5, when three sheave carrier devices 50 are used, at 90° from one another around the soil plate, the maximum cut of the soil core by the cable will be from its initial position, indicated at 64a, to its position shown at 64b. The undercutting can be carried out further, by removing one sheave carrier and by then using two sheave devices positioned at 50a in FIG. 5. The maximum cut will now extend inwardly from the trench to the position of the cable shown at 64c. Further cutting can now be accomplished by using one sheave carrier device 50, as, for example, the one spaced diametrically opposite from pulleys 71 and 72. The undercut can now extend inwardly to the cable position indicated at 64d. The remainder of the undercut can be accomplished by removing the cable from the last mentioned sheave, and whipsawing the portion of the core lying between the cable positions indicated at 64d, until the entire soil core is undercut.

In removing the cable from each sheave carrier 50, the cable is placed under tension so that the sheave 61 will be restrained from rotation. The square-headed rod 57 is then unscrewed by a suitable wrench from the sheave, allowing the sheave to fall to the bottom of the trench, thus freeing the cable therefrom. After the tree and soil core are later removed, the sheaves may be recovered from the hole.

Figures 12, 14:
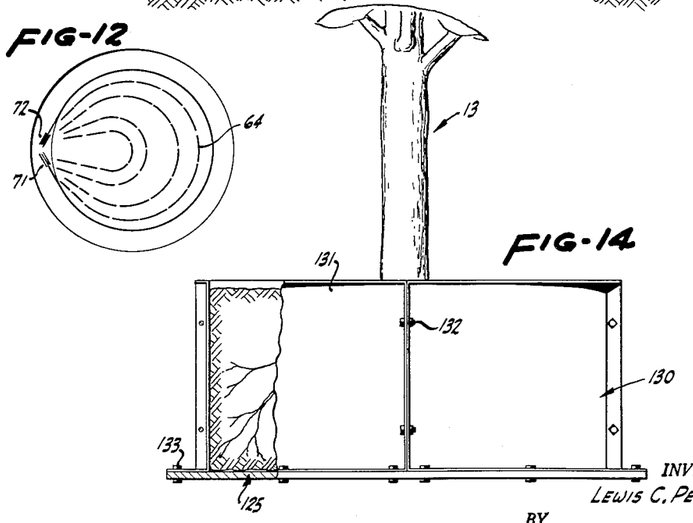
FIG. 12 is a schematic illustration of a manner in which the soil core may be undercut.
FIG. 14 is an elevational view, with parts broken away, showing a soil core encasing device usable in transporting the removed tree.

The number of sheaves used to support the cable during this operation will depend largely upon the soil condition at the depth at which the soil core is to be cut. If the ground is very hard and/or rocky, it will be advisable to use at least three sheave devices 50 so that only a relatively small portion of the cable will be actively engaging and cutting the core during the whipsaw motion thereof. If the soil is very loose and/or sandy such that there is little resistance to cutting, then the sheave devices may not be necessary. In such case, the cable 64 may be simply laid in the bottom of the trench around the soil core and may be driven by the cable drive mechanism to whipsaw the core. FIG. 12 illustrates schematically the position of the cable 64 as the undercutting progresses.

However, in any event, it is necessary that the cable be trained over the pulleys 71 and 72 to retain the cable in the bottom of the trench so that cutting will take place in a horizontal plane.

The cable 64 has an advantage of flexibility in case relatively small rocks are encountered, in that the cable can slip over or under the rock during the cutting.

FIG. 6 illustrates a modified cable, 64', which may be used in instances requiring an increased cutting action. A plurality of beads 103, having outwardly extending flanges provided with sharp shoulders 104, are secured around the cable 64'. As the cable moves back and forth, the shoulders 104 will have a much greater abrading effect on the soil core than will the cable along, and the undercutting will be greatly facilitated.

After the undercutting operation has been completed, the sheave carrier devices 50 and cable drive mechanism 65 are all dismantled from the soil plate 10.

*Bottom Supporting Mechanism*

After completion of the undercutting operation, the severed soil core is bottom supported by the support apparatus 110 illustrated in FIGS. 9 and 10.

The core bottom support apparatus comprises a base plate 111 adapted to be secured to the soil plate index holes 21 by bolts 112. A skirt 113 depends downwardly from base plate 111 to engage the side of the trench adjacent the soil plate to help retain the integrity of the soil core when it is removed.

The outer portion of base plate 111 has a threaded hole therethrough in which is threaded an elongated pipe collar 114. A vertically disposed rod, or tube, 115 extends downwardly through the collar 114 and is provided at its end with a horizontal support plate 116. The upper end of tube 115 is provided with a plurality of vertically spaced holes 117.

In operation, the support apparatus 110 is bolted to the soil plate, with the support plate 116 disposed in the bottom of the trench 47 as shown by solid lines in FIG. 11. A bar 119 is then inserted through a set of the tube holes 117 and the tube is twisted manually so as to force the support plate 116 into the previously undercut kerf, so that the support members will be in the dotted line position thereof in FIG. 11. A suitable retainer rod or pin (or the bar 119 as shown) is inserted through suitable holes 117 and the pipe collar 114 is screwed upwardly until it engages the retainer pin, as shown in FIG. 10. In this position, the support plate 116 will be prevented from moving downwardly relative to the soil plate during the removing operation and will firmly support the soil core against the soil plate 10.

Although the support plate 116 has been illustrated as being rectangular in shape, it is to be realized that it could be curved, with a radius of curvature approximately equal to the radius of the trench 47. In such case the support plate 116 could be made longer, and when swung under the soil core would extend further towards the center of the soil core to increase the supporting effect.

After a sufficient number of bottom supporting devices 110 have been installed, the tree 13 and soil core surrounding its roots are ready to be removed.

*Removing and Transporting Apparatus*

Figure 13:
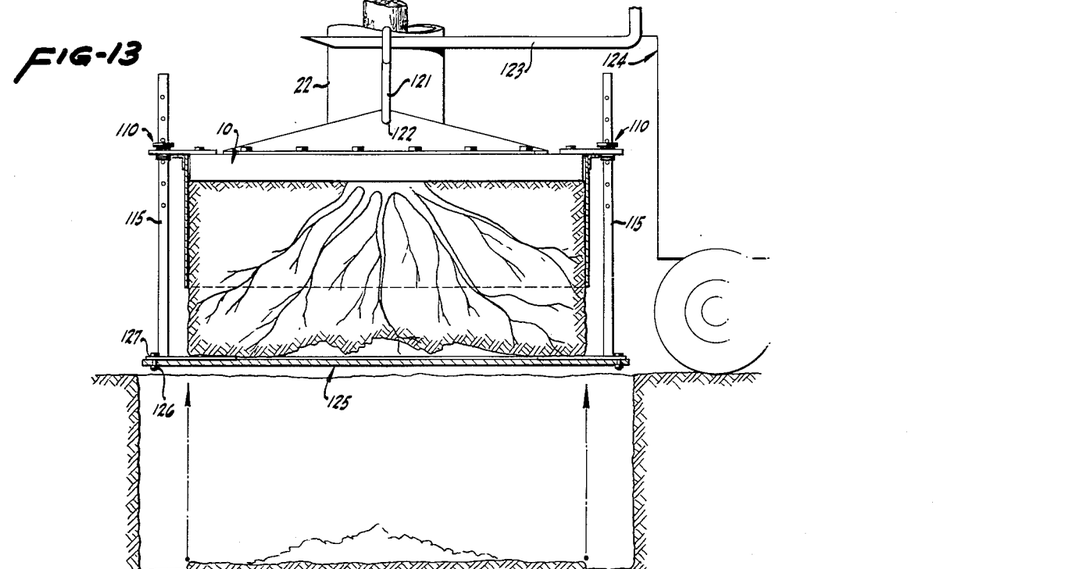
FIG. 13 is an elevational view illustrating the removal of the tree from the ground, and showing the use of a bottom plate.

The apparatus for and operation of removing the tree 13 from the ground is illustrated in FIG. 13.

Lifting hooks 121 are attached to the apical holes 122 of the lifting plates 27 bolted to the soil plate, and are hooked around the lifting tines 123 of a suitable fork-lift truck 124.

The lift truck then lifts the entire tree, soil plate and soil core vertically upward to remove the tree from the ground. The soil plate pneumatic collar 22, due to its firm gripping engagement with the tree trunk 12, helps to prevent the soil core from pulling away from the soil plate, which pulling away is also prevented by the core bottom support plates 116.

Although the central portion of the bottom of the soil core is unsupported from beneath by the support plates 116, the integrity of the soil core thereat is maintained by the root structure so that there is no undue loss of soil from the core during the lifting operation.

During the removal operation, the pneumatic soil plate collar 22 helps support the tree vertically and thus greatly reduces any tendency for the tree to move or sway relative to the soil core, thereby preventing the root hairs from tearing from the root structure.

After removal, a bottom plate 125, made from plywood or any other suitable material, is bolted to the outer edges of the bottom support plates 116 by bolts 126 which extend through holes 127 formed through the outer portions of the support plates. The tree and soil core can now be transported easily without undue fear of damage to the tree or loss of soil therefrom.

In the event that the tree may be subjected to fairly rough handling during shipment, the semi-permanent segmented shield 130 may be placed around the soil core. The shield 130 is comprised of a plurality of quarter segments 131, bolted together by bolts 132 to completely surround the soil core. The shield 130 is bolted to the bottom plate 125 as by bolts 133, and extends upwardly around the soil core. The soil plate 10 may be removed, if desired, to be used for another tree removing operation. When so assembled, the soil core is completely enclosed at the sides and bottom thereof by the shield 130 and bottom plate 125 so as to be protected against damage. In addition, the shield 130 will prevent the soil from drying out so that there is little fear of the tree's dying from lack of moisture.

In replanting the tree, a suitable hole is dug, and the tree and soil core are placed therein by a process generally the reverse of that previously described. If desired, the plywood bottom plate 125 could be left on the bottom of the soil core, as it will eventually rot away. Also, the plywood bottom plate could be perforated if it is decided to leave it attached to the soil core so that rootlets may grow therethrough.

As is apparent from the foregoing description, the soil plate 10 ensures that the trenching, undercutting, bottom supporting and lifting operation can be carried out easily. In addition, the soil plate protects the top of the soil core during these operations, since it aids greatly in preventing the top of the core from crumbling into the ditch 47 by distributing the weight of workmen or the like thereon over a large surface area.

It is to be realized that the invention shown and described above is to be taken as a preferred embodiment of the same, and that various changes in the shape, size and arrangement of parts may be resorted to without departing from the spirit of the invention or the scope of the attached claims.

Having thus described my invention, what I claim and desire to secure by Letters Patent is:

1. In apparatus for removing a mature tree from the ground, the improvement comprising a segmented circular soil plate having a central aperture therethrough, said soil plate being disposed upon said ground with the trunk of said tree extending upwardly through said aperture, means holding the segments of said soil plate in rigid relationship one to another, a vertically disposed and upwardly extending cylindrical collar rigidly mounted on said soil plate coaxially therewith around said tree trunk, and inflatable packer means carried by said collar therewithin for tight gripping engagement with said tree trunk when said packer means is inflated.

2. In apparatus for removing a mature tree from the ground, the improvement comprising a horizontally disposable segmented circular soil plate having a central aperture therethrough, said soil plate having a diameter approximately equal to the horizontal diameter of the limb structure of said tree, means holding the segments of said soil plate in rigid relationship one to another, said soil plate having a plurality of pin and bolt receiving index holes spaced around the periphery thereof, a vertically disposed and upwardly extending cylindrical collar rigidly mounted on said soil plate coaxially therewith, and inflatable packer means carried by said collar therewithin for tight gripping engagement with said tree trunk when said packer means is inflated.

3. In apparatus for removing a mature tree from the ground, the improvement comprising a segmented circular soil plate having a central aperture therethrough, said soil plate being disposed upon said ground with the trunk of said tree extending upwardly through said aperture, said soil plate having a diameter approximately equal to the horizontal diameter of the limb structure of said tree, means holding the segments of said soil plate in rigid relationship one to another, means extending downwardly from said soil plate into the ground therebelow for preventing relative horizontal movement of said soil plate relative to said ground and tree trunk, said soil plate having a plurality of pin and bolt receiving index holes spaced around the periphery thereof, a vertically disposed and upwardly extending cylindrical collar rigidly mounted on said soil plate coaxially therewith around said tree trunk, and inflatable packer means carried by said collar therewithin for tight gripping engagement with said tree trunk when said packer means is inflated.

4. Apparatus as set forth in claim 3 and further including a trench digging means, means for mounting said trench digging means at preselected points around the periphery of said soil plate to dig a continuous trench around the perihphery of said soil plate, and means mounted at a fixed height relative to said soil plate for limiting the depth of said trench.

5. Apparatus as set forth in claim 3 and further including a rail, means operatively associated with said soil plate index holes for mounting said rail vertically at desired positions around the periphery of said soil plate, post hole digger means mounted for vertical movement on said rail for drilling a vertical hole into said ground at the periphery of said soil plate, and an adjustable stop member carried by said rail for limiting downward movement of said post hole digger means thereon, the diameter of the hole drilled by said post hole digger means being related to said soil plate index holes such that when said rail is mounted relative to successively adjacent index holes the vertical holes drilled by said post hole digger will intersect one another.

6. Apparatus as set forth in claim 3 wherein said ground has a trench of uniform depth formed therein around the periphery of said soil plate, and wherein said apparatus further includes at least one sheave carrier, means operatively associated with a selected soil plate index hole for mounting said sheave carrier rigidly to said soil plate, a sheave mounted on said sheave carrier adjacent the bottom of said trench for rotation about a vertical axis, a cable disposed in the bottom of said trench around the periphery of said soil plate and trained around said sheave, pulley means disposed adjacent the bottom of said trench and in fixed relation to said soil plate, a pair of cable drums mounted on said soil plate, the ends of said cable being trained around said pulley means and secured to said cable drums, a power drive means, and means to alternatively drivingly connect said power drive means to one of said cable drums while braking the other of said cable drums from rotation thereof, and means to pull the free ends of said cable back and forth under tension.

7. Apparatus as set forth in claim 3 wherein said ground has a trench of uniform depth formed therein around the periphery of said soil plate and wherein the core of earth underlying said soil plate and bounded by said trench has been undercut in a horizontal plane, said apparatus further including a plurality of core bottom support devices, means operatively associated with said soil plate index holes for mounting each of said core bottom support devices rigidly to said soil plate at preselected points around the periphery thereof; each of said core bottom support devices comprising a vertically rotatable rod extending downwardly from the periphery of said soil plate to adjacent said undercut, an elongated horizontal support plate fixedly mounted to the lower end of said rod for movement into said undercut upon rotation of said rod, means carried by said support device for preventing downward movement of said rod relative to said soil plate when said support plate is disposed in said undercut, and a skirt mounted on said support device and depending downwardly from said soil plate in engagement with the side of the trench adjacent said soil plate.

8. In apparatus for removing a mature tree from the ground, the improvement comprising a rigid circular soil plate having a central aperture therethrough, said soil plate being disposed upon said ground with the trunk of said tree extending upwardly through said aperture, a trench digging means, and means for mounting said trench digging means at preselected points around the periphery of said soil plate for digging a continuous trench around the periphery of said soil plate.

9. In apparatus for removing a mature tree from the ground, the improvement comprising a rigid circular soil plate having a central aperture therethrough, said soil plate being disposed upon said ground with the trunk of said tree extending upwardly through said aperture, said soil plate having a plurality of indexing means spaced around the periphery thereof, a trench digging means, means for mounting said trench digging means at preselected indexing means around the periphery of said soil plate to dig a continuous trench around the periphery of said soil plate, and means mounted at a fixed height relative to said soil plate for limiting the depth of said trench.

10. In apparatus for removing a mature tree from the ground, the improvement comprising a rigid circular soil plate having a central aperture therethrough, said soil plate being disposed upon said ground with the trunk of said tree extending upwardly through said aperture, said soil plate having a plurality of indexing means spaced around the periphery thereof, a rail, means operatively associated with said soil plate indexing means for mounting said rail vertically at desired positions around the periphery of said soil plate, post hole digger means mounted for vertical movement on said rail for drilling a vertical hole into said ground at the periphery of said soil plate.

11. In apparatus for removing a mature tree from the ground, the improvement comprising a rigid circular soil plate having a central aperture therethrough, said soil plate being disposed upon said ground with the trunk of said tree extending upwardly through said aperture, said soil plate having a plurality of indexing means spaced around the periphery thereof, a rail, means operatively associated with said soil plate indexing means for mounting said rail vertically at desired positions around the periphery of said soil plate, post hole digger means mounted for vertical movement on said rail for drilling a vertical hole into said ground at the periphery of said soil plate, and an adjustable stop member carried by said rail for limiting downward movement of said post hole digger means thereon.

12. In apparatus for removing a mature tree from the ground, the improvement comprising a rigid circular soil plate having a central aperture therethrough, said soil plate being disposed upon said ground with the trunk of said tree extending upwardly through said aperture, said soil plate having a plurality of indexing means spaced around the periphery thereof, a rail, means operatively associated with said soil plate indexing means for mounting said rail vertically at desired positions around the periphery of said soil plate, post hole digger means mounted for vertical movement on said rail for drilling a vertical hole into said ground at the periphery of said soil plate, and an adjustable stop member carried by said rail for limiting downward movement of said post hole digger means thereon, the diameter of the hole drilled by said post hole digger means being related to said soil plate index holes such that when said rail is mounted relative to successively adjacent index holes the vertical holes drilled by said post hole digger will intersect one another.

13. In apparatus for removing a mature tree from the ground, the improvement comprising a rigid circular soil plate having a central aperture therethrough, said soil plate being disposed upon said ground with the trunk of said tree extending upwardly through said aperture, said ground having a trench of uniform depth formed therein around the periphery of said soil plate, a sheave carrier, means operatively associated with a selected soil plate indexing means for mounting said sheave carrier rigidly to said soil plate, a sheave mounted on said sheave carrier adjacent the bottom of said trench for rotation about a vertical axis, a cable disposed in the bottom of said trench around the periphery of said soil plate and trained around said sheave, pulley means disposed adjacent the bottom of said trench and mounted in fixed relation to said soil plate, the ends of said cable being trained around said pulley means and extending upwardly from said trench, and means to pull the free ends of said cable back and forth under tension.

14. In apparatus for removing a mature tree from the ground, the improvement comprising a rigid circular soil plate having a central aperture therethrough, said soil plate being disposed upon said ground with the trunk of said tree extending upwardly through said aperture, said soil plate having a plurality of indexing means spaced around the periphery thereof, said ground having a trench of uniform depth formed therein around the periphery of said soil plate, a sheave carrier, means operatively associated with a selected soil plate indexing means for mounting said sheave carrier rigidly to said soil plate, a sheave mounted on said sheave carrier adjacent the bottom of said trench for rotation about a vertical axis, a cable disposed in the bottom of said trench around the periphery of said soil plate and trained around said sheave, pulley means disposed adjacent the bottom of said trench and mounted in fixed relation to said soil plate, a pair of cable drums mounted on said soil plate, the ends of said cable being trained around said pulley means and secured to said cable drums, a power drive means, and means to alternately drivingly connect said power drive means to one of said cable drums while braking the other of said cable from rotation thereof.

15. In apparatus for removing a mature tree from the ground, the improvement comprising a rigid circular soil plate having a central aperture therethrough, said soil plate being disposed upon said ground with the trunk of said tree extending upwardly through said aperture, said soil plate having a plurality of indexing means spaced around the periphery thereof, said ground having a trench of uniform depth formed therein around the periphery of said soil plate and having the core of earth underlying said soil plate and bounded by said trench undercut in a horizontal plane, a plurality of core bottom support devices, means operatively associated with said soil plate indexing means for mounting each of said core bottom support devices rigidly to said soil plate at preselected points around the periphery thereof; each of said core bottom support devices comprising a vertically rotatable rod extending downwardly from the periphery of said soil plate to adjacent said undercut, an elongated horizontal support plate fixedly mounted to the lower end of said rod for movement into said undercut upon rotation of said rod.

16. In apparatus for removing a mature tree from the ground, the improvement comprising a rigid circular soil plate having a central aperture therethrough, said soil plate being disposed upon said ground with the trunk of said tree extending upwardly through said aperture, said soil plate having a plurality of indexing means spaced around the periphery thereof, said ground having a trench of uniform depth formed therein around the periphery of said soil plate and having the core of earth underlying said soil plate and bounded by said trench undercut in a horizontal plane, a plurality of core bottom support devices, means operatively associated with said soil plate indexing means for mounting each of said core bottom support devices rigidly to said soil plate at preselected points around the periphery thereof; each of said core bottom support devices comprising a vertically rotatable rod extending downwardly from the periphery of said soil plate to adjacent said undercut, an elongated horizontal support plate fixedly mounted to the lower end of said rod for movement into said undercut upon rotation of said rod, and means carried by said support device for preventing downward movement of said rod relative to said soil plate when said support plate is disposed in said undercut.

17. Apparatus as set forth in claim 16 and further including means to lift said soil plate vertically so as to remove said tree and undercut core of earth as a unit from the ground.

18. In apparatus for removing a mature tree from the ground, the improvement comprising a rigid circular soil plate having a central aperture therethrough, said soil plate being disposed upon said ground with the trunk of said tree extending upwardly through said aperture, said soil plate having a plurality of indexing means spaced around the periphery thereof, said ground having a trench of uniform depth formed therein around the periphery of said soil plate and having the core of earth underlying said soil plate and bounded by said trench undercut in a horizontal plane, a plurality of core bottom support devices, means operatively associated with said soil plate indexing means for mounting each of said core bottom support devices rigidly to said soil plate at preselected points around the periphery thereof; each of said core bottom support devices comprising a vertically rotatable rod extending downwardly from the periphery of said soil plate to adjacent said undercut, an elongated horizontal support plate fixedly mounted to the lower end of said rod for movement into said undercut upon rotation of said rod, and a skirt mounted on said support device and depending downwardly from said soil plate in engagement with the side of the trench adjacent said soil plate.

19. In apparatus for removing a mature tree from the ground, the improvement comprising a rigid circular soil plate having a central aperture therethrough, said soil plate being disposed upon said ground with the trunk of said tree extending upwardly through said aperture, said soil plate having a plurality of indexing means spaced around the periphery thereof, said ground having a trench of uniform depth formed therein around the periphery of said soil plate and having the core of earth underlying said soil plate and bounded by said trench undercut in a horizontal plane, a plurality of core bottom support devices, means operatively associated with said soil plate indexing means for mounting each of said core bottom support devices rigidly to said soil plate at preselected points around the periphery thereof; each of said core bottom support devices comprising a vertically rotatable rod extending downwardly from the periphery of said soil plate to adjacent said undercut, an elongated horizontal support plate fixedly mounted to the lower end of said rod for movement into said undercut upon rotation of said rod, means carried by said support device for preventing downward movement of said rod relative to said soil plate when said support plate is disposed in said undercut, and a skirt mounted on said support device and depending downwardly from said soil plate in engagement with the side of the trench adjacent said soil plate.

20. Apparatus as set forth in claim 19 and further including means to lift said soil plate vertically so as to remove said tree and undercut core of earth as a unit from the ground.

21. Apparatus for removing a mature tree from the ground comprising a rigid circular soil plate having a central aperture therethrough, said soil plate being disposed upon said ground with the trunk of said tree extending upwardly through said aperture, said soil plate having a plurality of indexing means spaced around the periphery thereof, a vertically disposed and upwardly extending cylindrical collar rigidly mounted on said soil plate coaxially therewith around said tree trunk, inflated packer means carried by said collar therewithin in tight gripping engagement with said tree trunk, said ground having a trench of uniform depth formed therein around the periphery of said soil plate and having the core of earth underlying said soil plate and bounded by said trench undercut in a horizontal plane, a plurality of core bottom support devices, means operatively associated with said soil plate indexing means for mounting each of said core bottom support devices rigidly to said soil plate at preselected points around the periphery thereof; each of said core bottom support devices comprising a vertically rotatable rod extending downwardly from the periphery of said soil plate to adjacent said undercut, an elongated horizontal support plate fixedly mounted to the lower end of said rod for movement into said undercut upon rotation of said rod, means carried by said support device for preventing downward movement of said rod relative to said soil plate when said support plate is disposed in said undercut, and means to lift said soil plate vertically so as to remove said tree and undercut core of earth as a unit from said ground.

References Cited in the file of this patent

UNITED STATES PATENTS

| | | |
|---|---|---|
| 594,668 | Wilkens | Nov. 30, 1897 |
| 694,740 | Guenther | Mar. 4, 1902 |
| 1,139,735 | Spuhr | May 18, 1915 |
| 1,537,953 | Lucich | May 19, 1925 |
| 1,976,160 | Coplen | Oct. 9, 1934 |
| 2,074,695 | Jimerson | Mar. 23, 1937 |
| 2,120,114 | Patton | June 7, 1938 |
| 2,314,567 | Vogel | Mar. 23, 1943 |
| 2,643,096 | Bates | June 23, 1953 |

FOREIGN PATENTS

| | | |
|---|---|---|
| 14,100 | Great Britain | Apr. 29, 1852 |